United States Patent
Karuta et al.

(10) Patent No.: US 7,352,913 B2
(45) Date of Patent: Apr. 1, 2008

(54) SYSTEM AND METHOD FOR CORRECTING MULTIPLE AXIS DISPLACEMENT DISTORTION

(75) Inventors: Bonaventure Karuta, North York (CA); Louie Lee, Richmond Hill (CA)

(73) Assignee: Silicon Optix Inc., Ontario (CA)

( * ) Notice: Subject to any disclaimer, the term of this patent is extended or adjusted under 35 U.S.C. 154(b) by 321 days.

(21) Appl. No.: 10/166,692

(22) Filed: Jun. 12, 2002

(65) Prior Publication Data
US 2003/0043303 A1 Mar. 6, 2003

Related U.S. Application Data

(60) Provisional application No. 60/297,241, filed on Jun. 12, 2001.

(51) Int. Cl.
*G06K 9/40* (2006.01)
(52) U.S. Cl. .......................... 382/275; 348/746; 353/70
(58) Field of Classification Search ................ 382/275, 382/100, 293, 215, 255; 353/69, 70; 348/746
See application file for complete search history.

(56) References Cited

U.S. PATENT DOCUMENTS

| | | | |
|---|---|---|---|
| 5,175,808 A * | 12/1992 | Sayre ........................... | 345/647 |
| 5,465,121 A | 11/1995 | Blalock et al. | |
| 5,594,676 A | 1/1997 | Greggain et al. | |
| 6,046,773 A * | 4/2000 | Martens et al. ......... | 375/240.25 |
| 6,219,011 B1 * | 4/2001 | Aloni et al. ................. | 345/1.3 |
| 6,281,931 B1 * | 8/2001 | Tsao et al. ................... | 348/247 |
| 6,305,805 B1 * | 10/2001 | Liebenow .................... | 353/69 |
| 6,367,933 B1 * | 4/2002 | Chen et al. .................... | 353/69 |
| 6,456,339 B1 * | 9/2002 | Surati et al. ................. | 348/745 |
| 6,520,646 B2 * | 2/2003 | Rodriguez et al. ........... | 353/69 |

(Continued)

FOREIGN PATENT DOCUMENTS

EP 0 777 198 A1 6/1997

(Continued)

OTHER PUBLICATIONS

Goel, J. et al: Correcting Distortions in Digital Displays and Projectors Using Real-Time Digital Image Warping: Society for Information Display 1999 SID International Symposium, Seminar & Exhibition, San Jose, CA, USA.

(Continued)

*Primary Examiner*—Matthew C. Bella
*Assistant Examiner*—Dennis Rosario
(74) *Attorney, Agent, or Firm*—Sughrue Mion, PLLC

(57) ABSTRACT

A system and method for correcting distortion in projected images caused by the projection of an input image by a projector lens onto a projection screen having a surface that is not orthogonal to the projection axis of the projector. Projection parameters including the focal length of the projector lens and the angles that represent the pan, tilt and roll angle of the projector are obtained. Then the projected area and the best viewable rectangular area that fits within said projected area is determined. The distortion is then characterized by using a distortion transformation which corresponds to the transformation that exists between the vertices of the best viewable rectangular area and the corresponding vertices of the projected area. Finally, the distortion transformation is inverted and applied to input image to obtain a distortion free projected image.

21 Claims, 15 Drawing Sheets

U.S. PATENT DOCUMENTS

| | | |
|---|---|---|
| 6,568,814 B2 * | 5/2003 | Rodriguez et al. ............ 353/69 |
| 6,686,973 B2 * | 2/2004 | Su .............................. 348/745 |
| 2001/0014180 A1 * | 8/2001 | Ejiri et al. .................. 382/275 |
| 2004/0130869 A1 | 7/2004 | Shin et al. |
| 2004/0158558 A1 | 8/2004 | Kim |

FOREIGN PATENT DOCUMENTS

| | | |
|---|---|---|
| EP | 0 965 945 A1 | 12/1999 |
| GB | 2 359 688 A | 12/2000 |
| WO | WO 00/21282 | 4/2000 |

OTHER PUBLICATIONS

Sukthankar, R. et al: Automatic Keystone Correction for Camera-Assisted Presentation Interfaces; Advances in Multimodal Interfaces-ICMI 2000, Beijing, CHINA.

Salomon, D., Computer Graphics and Geometric Modeling, Springer-Verlag, Chapter 3, Transformations and Projections, XP001091417, 1999.

W.H. Press, S. A. Teukolsky, W. T. Vetterling, B. P. Flannery, "Numerical Recipes in C: The Art of Scientific Computing", Cambrige University Press, Second Edition 1992, ISBN 0-521-43108-5. Chapter 10: Minimization of Maximization of Functions (pp. 394-455).

The following four notices (1), (2), (3) and (4) are PCT notices in the corresponding PCT Application No. PCT/CA02/00870.

(1) Notification of Transmittal of the International Search Report or the Declaration.

(2) International Search Report.

(3) Written Opinion of the International Search Authority.

(4) International Preliminary Examination Report.

* cited by examiner

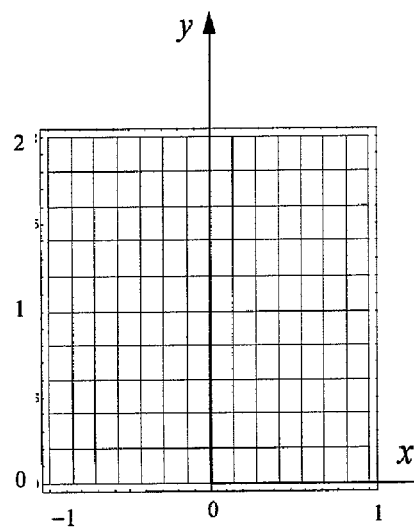
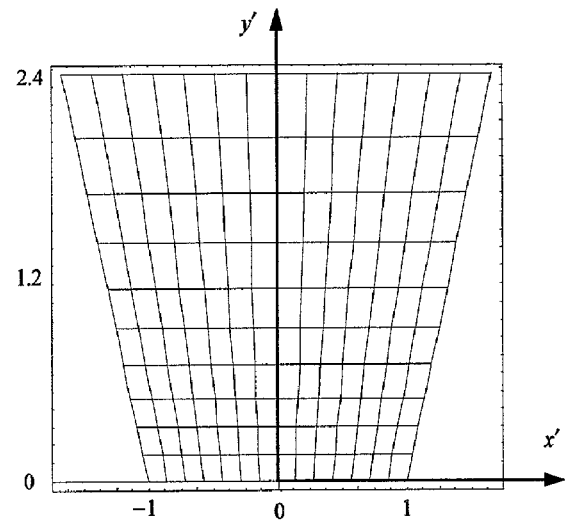
FIG. 1A (PRIOR ART)  FIG. 1B (PRIOR ART)
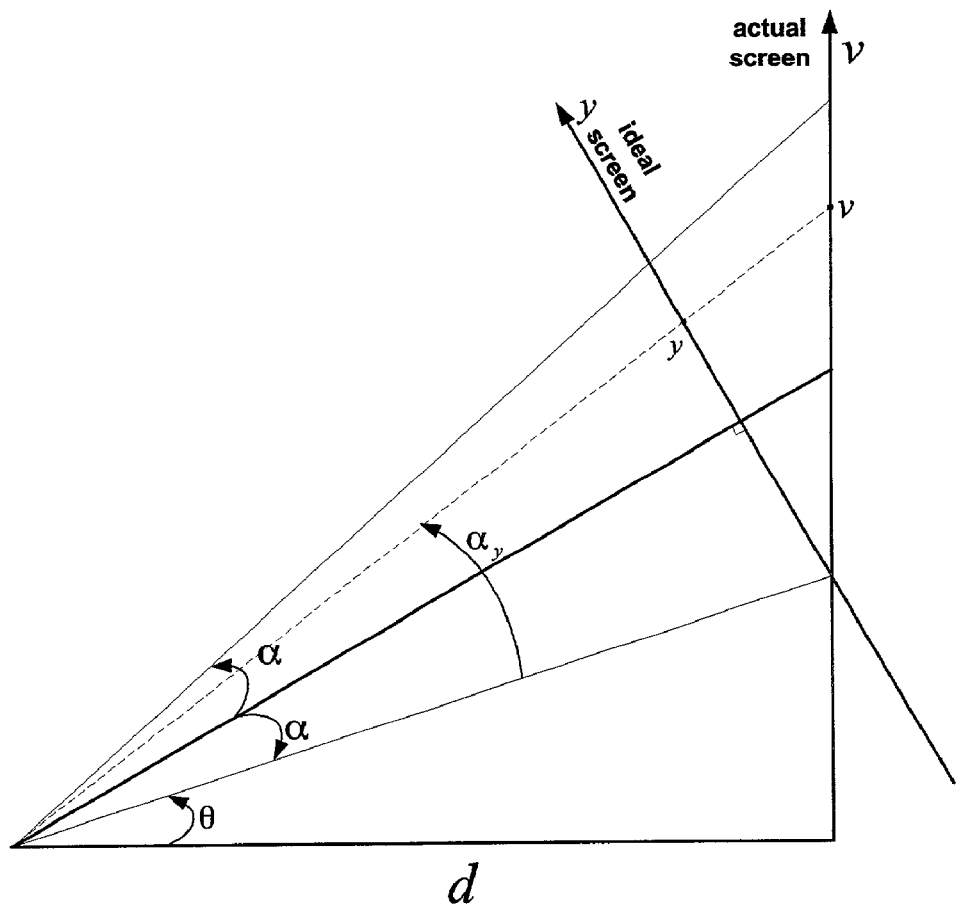
FIG. 2 (PRIOR ART)

$\theta = -20, \varphi = 30, \psi = 0$
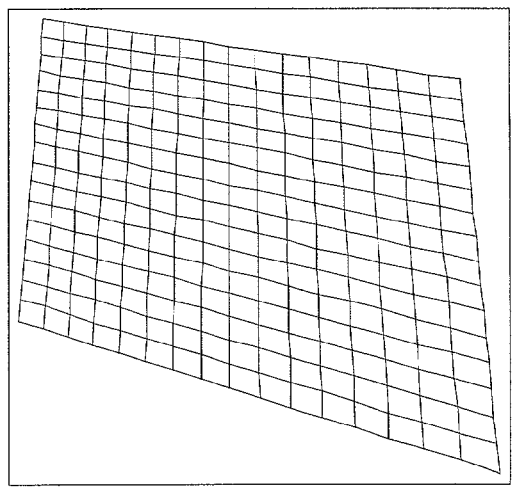
$\theta = -20, \varphi = 30, \psi = 10$
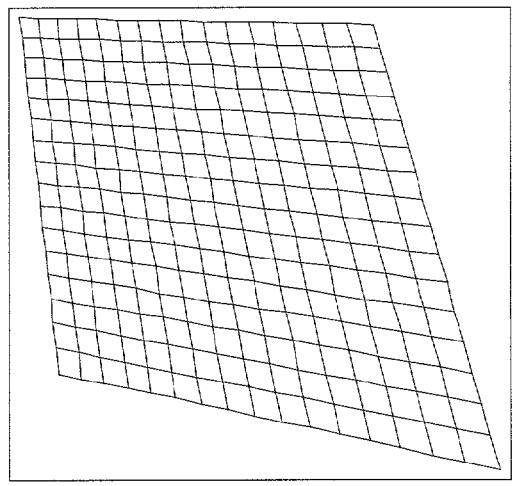
$\theta = -20, \varphi = 30, \psi = -10$
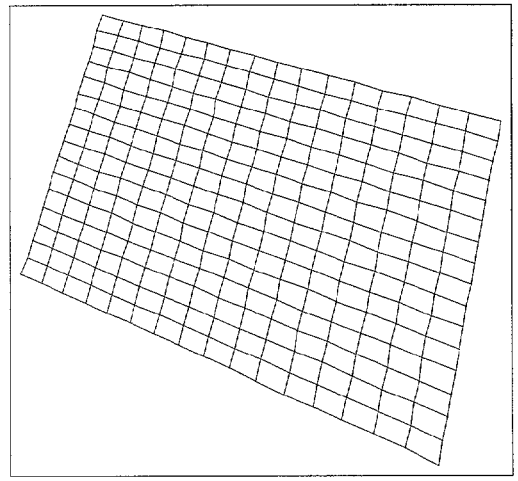
FIG. 4

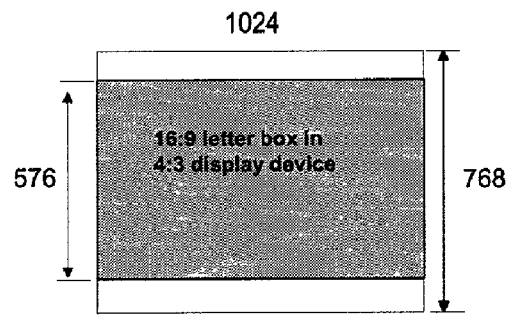
A
Anamorphic 16:9 scaled in a 4:3 XGA display image
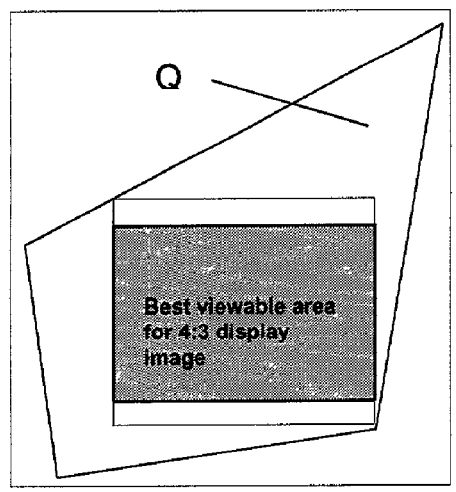
B
Projection of anamorphic 16:9 scaled in a 4:3 display image wihout aspect ratio maximization
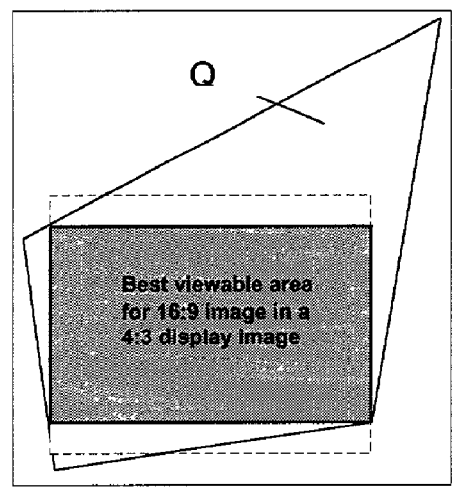
C
Projection of anamorphic 16:9 scaled in a 4:3 display image wih aspect ratio maximization
FIG. 10

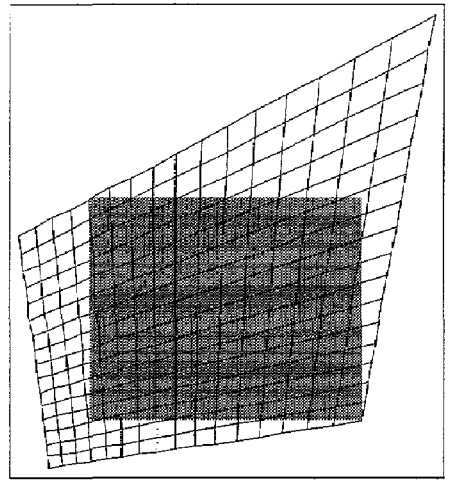
A
Forward transformation of a grid without aspect ratio conversion
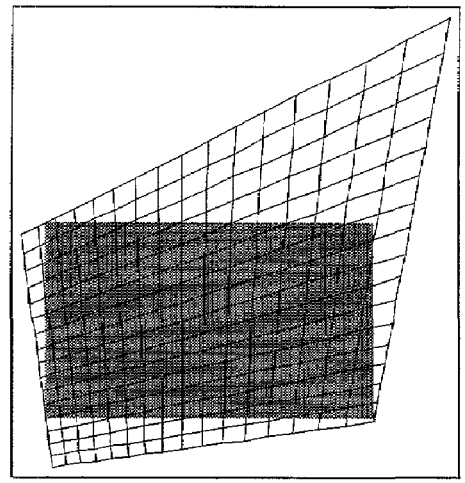
B
Forward transformation of a grid with aspect ratio conversion
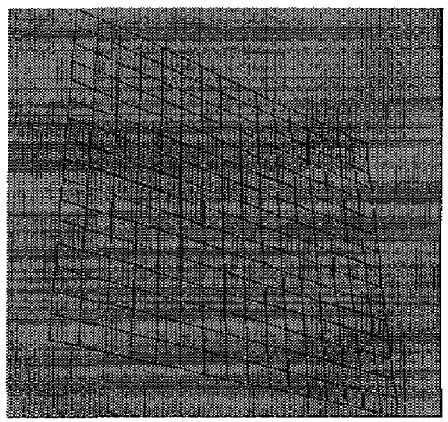
C
Inverse transformation of a grid without aspect ratio conversion
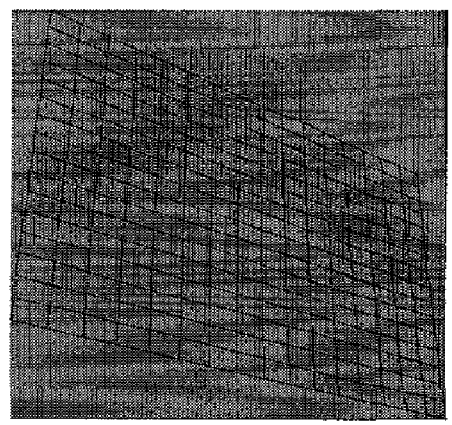
D
Inverse transformation of a grid with aspect ratio conversion
FIG. 11

FIG. 14A
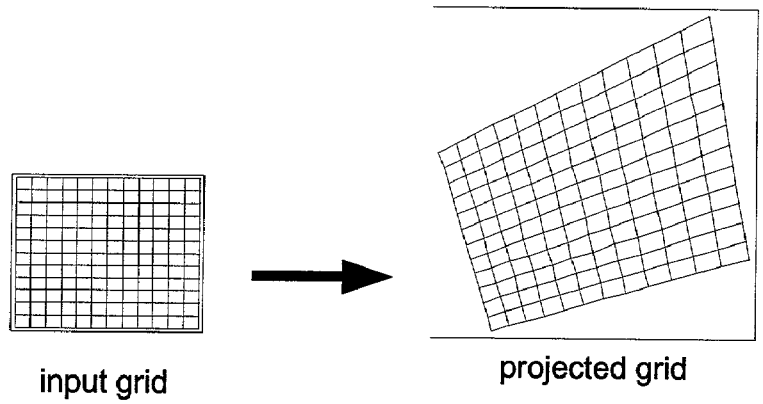
input grid → projected grid
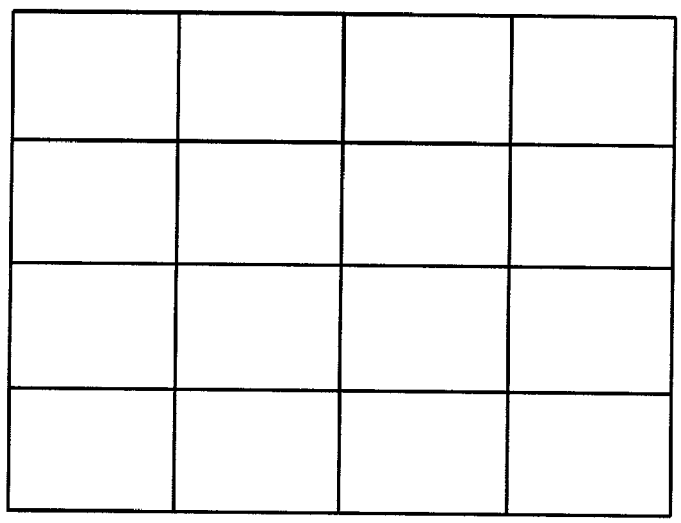
FIG. 14B
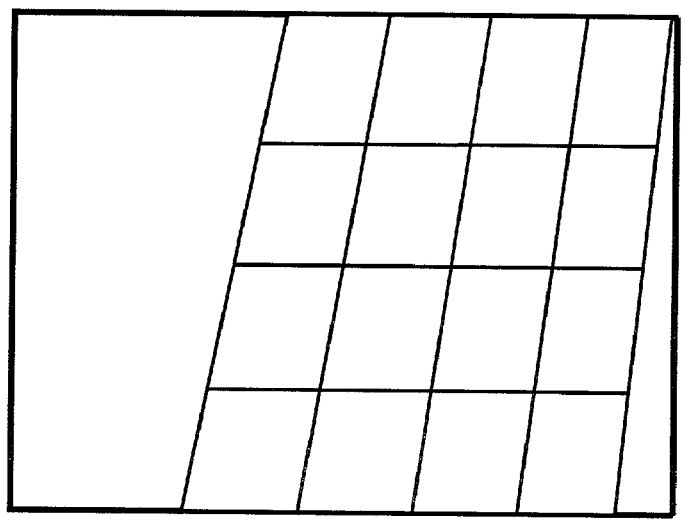
FIG. 14C

SYSTEM AND METHOD FOR CORRECTING MULTIPLE AXIS DISPLACEMENT DISTORTION

This application claims priority from U.S. Provisional Application No. 60/297,241 filed Jun. 12, 2001.

FIELD OF THE INVENTION

This invention relates to digital image processing and spatial image transformation, and in particular, to the correction of multiple axial displacement distortion in images.

BACKGROUND OF THE INVENTION

As is conventionally known, projecting an image onto a plane at an angle of elevation or depression causes keystone distortion. This is a common problem for projections where projectors are positioned below the screen to project upwards to the screen. The resulting images are generally known as having a "top-heavy" appearance.

FIGS. 1A, 1B and 2 illustrate the effect of off-axis projection. Specifically, FIG. 2 shows a projection configuration of a projector 5 and a screen 7 for the square image of FIG. 1. The ideal projection shown in FIG. 1A is from the ideal screen shown positioned along the y-axis and the top-heavy distorted projection shown in FIG. 1B is from an actual screen positioned along a v-axis. As can be seen the projected image contains top-heavy distortion of the square image and that the non-uniform spacing grid is due to perspective effect as shown in FIG. 2. The size of the distortion depends on projection angle θ, distance d from the projector 5 to the screen 7, and projector aperture 2α. FIG. 2 shows distortion along one axis only. Turning to FIG. 3, there is shown a projection diagram for the square image of FIG. 1 distorted along two axis by the tilt and pan angles θ, φ associated with projector 5 such that the distorted image shown on the projection screen (i.e. actual screen shown) results.

One type of prior art approach to correcting distortion in projection systems is to use mechanical systems to move the optical axis in order to compensate for actual distortion. However, such mechanical prior art system generally lack flexibility in that compensation is essentially limited to correcting one axis, usually along the vertical axis.

Another prior art solution is disclosed in U.S. Pat. No. 5,465,121 to Blalock et al. which uses a data processing system to correct distortion by removing pixels as necessary using a simple height and pixel equation. This system is, however, only effective for distortion along one axis, namely the vertical axis, and accordingly does not properly compensate for distortion along two or more axis.

Another prior art solution is described in U.S. Pat. No. 6,367,933 to Chen et al., namely a method for correcting keystone distortion resulting from off-axis projection in two angles, horizontal, pan, and vertical, tilt. The method performs a sequence of two one-axis keystone distortions to achieve a two-dimensional correction. First a correction for a tilt angle is corrected and then the resulting image is rotated by 90 degrees. The rotated image is corrected for a vertical angle distortion again but equivalent to the horizontal pan angle. The final image is obtained by rotating back the image by −90 degrees. Rotation by +/−90-degrees imposed intermediate memory to store rotated the whole or parts of rotated image. This approach introduces processing delays and memory cost. Further, this method is very specific to horizontal and vertical angles distortions only since rotation by +/−90 degrees can be achieved without using very complex interpolation techniques. If a roll angle were applied as well such as that shown in FIG. 4 (or any other distortion like radial lens distortion are applied to the image) then this method would require another specialized module to handle the situation, leading to processing delays and increased cost.

It is therefore desirable to provide a general method and system to correct multiple axial displacement distortion in images, which addresses, in part, some of the shortcomings of providing undistorted images as discussed above.

SUMMARY OF THE INVENTION

The invention provides in one aspect, a method for correcting image distortions within an image projection system having a projector with a projection axis, a projection lens having a focal length, and a viewing screen having a surface normal, the relative orientation of the projection lens and the viewing screen being associated with a set of geometric distortion parameters, and the projector being associated with a set of optical and said geometric distortion parameters, said method comprising:

(a) obtaining geometric and optical distortion parameters, said geometric distortion parameters including the focal length of the projection lens, the pan, tilt and roll angles of the projector axis in relation to the surface normal of the projection screen, and the aspect ratio of the input image relative to the aspect ratio of the display device, and said optical distortion parameters including a tangential lens distortion, a radial lens distortion, a projector aperture distortion, and a lens offset;

(b) determining the projected area on the viewing screen that results in the presence of the geometric distortion parameters and then determining a best viewable area that fits within said projected area such that the best viewable area is optimized in respect of at least one of image area and image resolution;

(c) characterizing the distortion due to the geometric distortion parameters using a geometric distortion transformation which corresponds to the transformation between the area within the vertices of the best viewable area and the corresponding area within the vertices of the projected area, said geometric distortion transformation being represented by surface fits each of which is a function of the geometric distortion parameters;

(d) characterizing the distortion due to the optical distortion parameters using an optical distortion transformation which corresponds to the transformation between the area within the vertices of the best viewable area and the corresponding area within the vertices of the projected area, said optical distortion transformation being represented by surface fits each of which is a function of the optical distortion parameters;

(e) concatenating said geometric distortion transformation and said optical distortion transformation into an overall distortion compensation transformation; and (f) applying the overall distortion compensation transformation to an input image to obtain a distortion free projected image on the optimized best viewable area on the viewing screen.

The invention provides in another aspect, an image projection system for correcting image distortions, said image projection system comprising:

a projector with a projection axis and an associated set of geometric distortion parameters;

(b) a projection lens having a focal length and associated set of optical distortion parameters;

(c) a viewing screen having a surface normal, the relative orientation of the projection axis and the surface normal also being associated with said set of geometric distortion parameters; and (d) an electronic correction component including a processor adapted to:

(i) obtain the geometric distortion parameters and the optical distortion parameters, said geometric distortion parameters including the focal length of the projection lens, the pan, tilt and roll angles of the projector axis in relation to the surface normal of the projection screen, and the aspect ratio of the input image relative to the aspect ratio of the viewing screen, and said optical distortion parameters including a tangential lens distortion, a radial lens distortion, a projector aperture distortion, and a lens offset;

(ii) determine the projected area on the viewing screen that results in the presence of the geometric distortion parameters and the optical distortion parameters and then determine a best viewable area that fits within said projected area such that the best viewable area is optimized in respect of at least one of image area and image resolution;

(iii) characterize the geometric distortion due to the geometric distortion parameters using a geometric distortion transformation which corresponds to the transformation between the area within the vertices of the best viewable area and the corresponding area within the vertices of the projected area, said geometric distortion transformation represented by surface fits each of which is a function of the geometric distortion parameters;

(iv) characterize the optical distortion due to the optical distortion parameters using an optical distortion transformation which corresponds to the transformation between the area within the vertices of the best viewable area and the corresponding area within the vertices of the projected area, said optical distortion transformation being represented by surface fits each of which is a function of the optical distortion parameters;

(v) concatenate said geometric distortion transformation and said optical distortion transformation into an overall distortion compensation transformation; and (vi) apply the overall distortion compensation transformation to an input image to obtain a distortion free projected image on the optimized viewing region on the viewing screen.

The invention provides in another aspect, an electronic component for correcting image distortions within an image projection system having a projector with a projection axis, a projection lens having a focal length, and a viewing screen having a surface normal, the relative orientation of the projection lens and the viewing screen being associated with a set of geometric distortion parameters, and the projector being associated with a set of optical and said geometric distortion parameters, said electronic correction component comprising a processor being adapted to:

(a) obtain the geometric distortion parameters and the optical distortion parameters, said geometric distortion parameters including the focal length of the projection lens, the pan, tilt and roll angles of the projector axis in relation to the surface normal of the projection screen, and the aspect ratio of the input image relative to the aspect ratio of the viewing screen, and said optical distortion parameters including a tangential lens distortion, a radial lens distortion, a projector aperture distortion, and a lens offset;

(b) determine the projected area on the viewing screen that results in the presence of the geometric distortion parameters and the optical distortion parameters and then determine a best viewable area that fits within said projected area such that the best viewable area is optimized in respect of at least one of image area and image resolution;

(c) characterize the geometric distortion due to the geometric distortion parameters using a geometric distortion transformation which corresponds to the transformation between the area within the vertices of the best viewable area and the corresponding area within the vertices of the projected area, said geometric distortion transformation represented by surface fits each of which is a function of the geometric distortion parameters;

(d) characterize the optical distortion due to the optical distortion parameters using an optical distortion transformation which corresponds to the transformation between the area within the vertices of the best viewable area and the corresponding area within the vertices of the projected area, said optical distortion transformation being represented by surface fits each of which is a function of the optical distortion parameters;

(e) concatenate said geometric distortion transformation and said optical distortion transformation into an overall distortion compensation transformation; and (f) apply the overall distortion compensation transformation to an input image to obtain a distortion free projected image on the optimized viewing region on the viewing screen.

Further aspects and advantages of the invention will appear from the following description taken together with the accompanying drawings.

BRIEF DESCRIPTION OF THE DRAWINGS

In the accompanying drawings:

FIGS. 1A and 1B are graphical representations of an ideal projection and a distorted projection of a square image on a projection screen;

FIG. 2 is a schematic diagram of a conventional prior art projector;

FIG. 4 are graphical representations of the projected image of a square input image when the three axes of the projector are not aligned with the screen reference axes;

FIG. 10A is a schematic diagram of an output image having different aspect ratio than the display device;

FIG. 10B is a schematic diagram illustrating the best viewable area for a projected 16:9 anamorphic image on a 4:3 display device;

FIG. 10C is a schematic diagram illustrating the best viewable area for a projected 16:9 anamorphic image on a 4:3 display device optimized to the 16:9 aspect ratio;

FIG. 11A is a schematic diagram illustrating the forward transformation of a projected image where the image different aspect ratio than the display device;

FIG. 11B is a schematic diagram illustrating the forward transformation of a projected image where the content has different aspect ratio than the display device and the projection area is optimize to match the content's aspect ratio.

FIG. 11C is a schematic diagram illustrating the inverse transformation of a projected image where the content has different aspect ratio with display device.

FIG. 11D is a schematic diagram illustrating the inverse transformation of a projected image where the input image has different aspect ratio than the display device and the projection area is optimized to match the content's aspect ratio;

FIG. 14A is a graphical representation of the distortion of an input square grid image when projected onto a projection screen;

FIG. 14B is a graphical representation of the input image of FIG. 14A;

FIGS. 14C and 14D are graphical representations of the first and second passes of the pre-distorted input image of FIG. 14B which together result in pre-distorted image (FIG. 14D) which will compensate for distortion when projected.

DETAILED DESCRIPTION OF THE INVENTION

Figure 3:
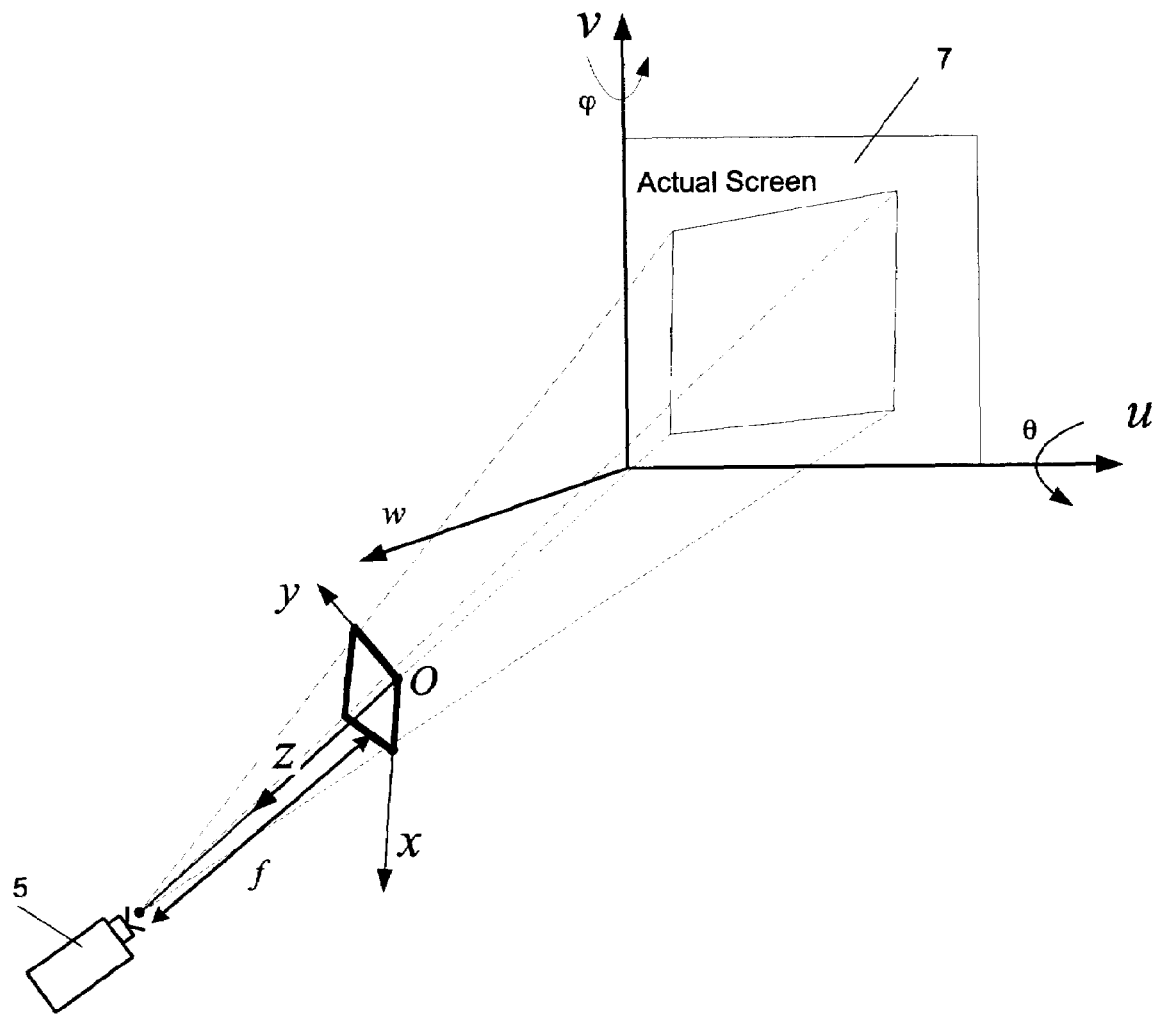
FIG. 3 is a schematic diagram of projection apparatus associated with the projected images of FIGS. 1A and 1B.
Figure 5:
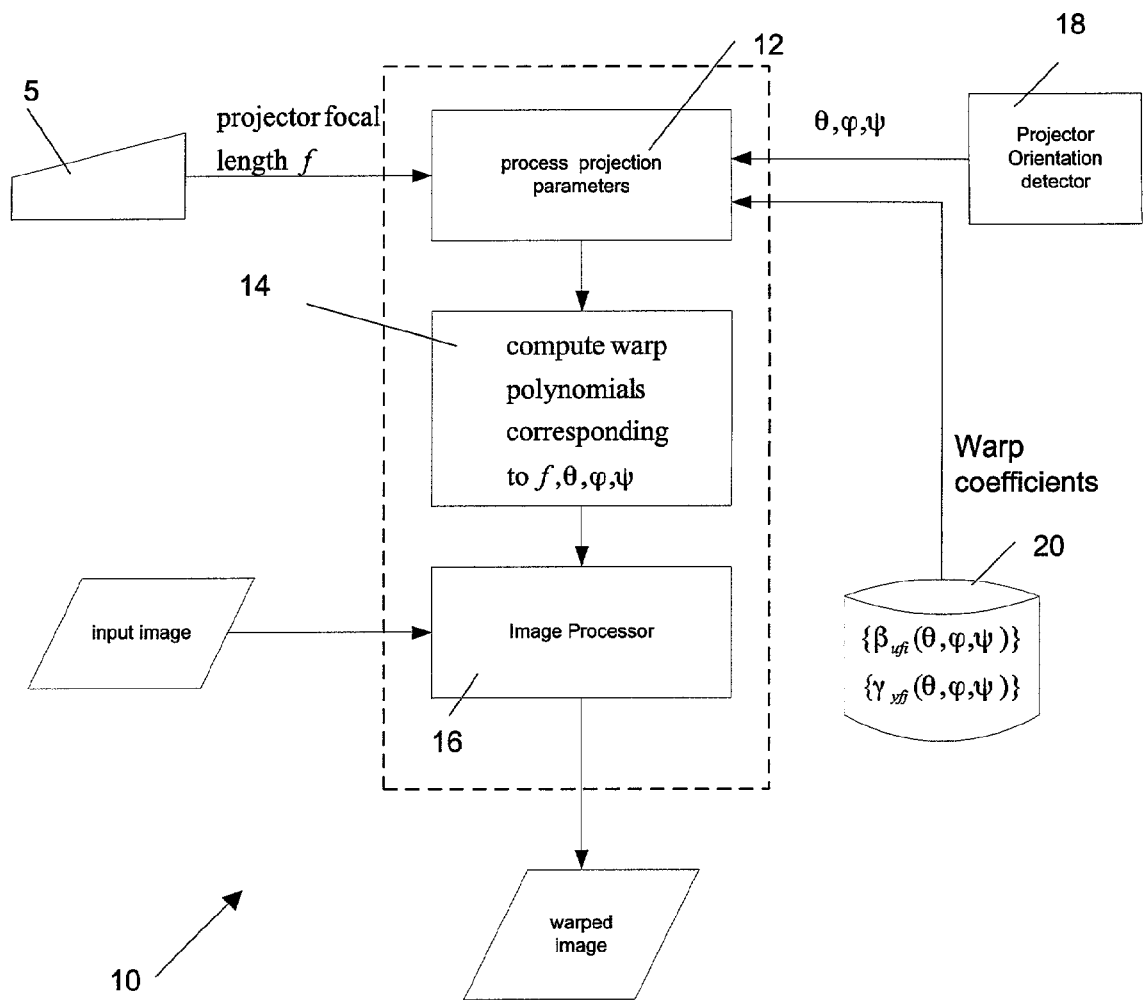
FIG. 5 is a block diagram of an example projection correction system of the present invention.

FIG. 5 illustrates an example projection correction system 10, built in accordance with the present invention. Specifically, correction system 10 identifies various projection distortion parameters, generates an inverse transformation corresponding to the projection parameters, receives and pre-distorts input image data by applying the inverse transformation, and outputs pre-distorted image data, which will appear distortion-free once projected on a screen (not shown). Specifically, correction system 10 includes a projection parameter module 12, a computational module 14, an image processor 16, a projection orientation detector 18, and a warp coefficient database 20.

The projector orientation detector 18 may be any automatic device that captures the relative orientation between the projector and the projection screen. While it is preferred that the user manually inputs the orientation to the system and the focal length of the optical system, although it should be understood that projection orientation detector 18 could also be used to provide the angle of orientation. Three important pieces of data are provided to correction system 10, namely the angle of orientation of the projector (as will be discussed in detail in relation to FIG. 7), the relative aspect ratio of the input image and the aspect ratio of the projector's display device, and the focal length f of the projector lens. The projection parameters are processed in order to find the proper index in a table of distortion parameters, which feed the image processor 16.

Projection parameter module 12 receives a range of projection parameter data that relates to the relative angular position between the axis of projection of projector 5 and the surface of projector screen 7 for a variety of relative angular positions. The projection parameter data can be detected by projection orientation detector 18 and provided to projection parameter module 12. A range of projection parameter data is utilized for a manual solution and it should be understood that for an automated solution, correction system 10 provides the angular position in real time and projection parameter module 12 identifies the corresponding distortion coefficients.

Warp computation module 14 generates an image transformation which will compensate for multiple axis displacement distortion. Specifically, warp computation module 14 computes warp polynomials that correspond to the projection parameter data provided by projection parameter module 12. Projection parameter module 12 obtains appropriate polynomial warp coefficients from warp coefficient database 20. Each warp coefficient is a function of angular positions and is evaluated and formatted by warp computation module 14 to provide input data that is suitable for processing by image processor 16.

Image processor 16, or warp engine, re-samples the input image according to the parameters of the inverse distortion. That is, the image transformation determined by warp computation module 14 is implemented in respect of the input image data so that when the inverse distorted input image is projected onto the screen, the final corrected image will result. As will be discussed, it is preferred for the image transformation to be performed as two 1D image transformations for reasons of processing efficiency. As is conventionally, known, two 1D transformations simply the hardware implementation for memory access and 2D filtering since a two dimension operation is reduced to two 1D operations.

The appearance of a projected image is affected by the specific angular position of projector 5 (i.e. the degree of rotation around three axes). Specifically, when there is off-axis displacement a distorted version of the input image will be projected on the screen. The distortion associated with the projected image is also function of the projector aperture or projector focal length, as well as lens geometry. The distortion can be completely defined by considering the 3D projection of a unit square where the center of projection is the optical center of projector, and where the intersection of projection cone with the screen surface is computed.

In order to project a projected image on as large an area as possible on projection screen 7, the projector field of view (FOV) is adjusted to it's maximum which is equivalent to choosing a minimum focal length. The projected image is then a function of the projector field of view (FOV) as well as the angles between the screen global coordinates and the projector reference axis. Transformation of coordinates representing the displacements of the projector are $R_p(\alpha)$, for a rotation of angle α around an axis p. Thus, the transformation matrices written in the conventionally known notation of homogenous coordinates are as follows:

$$R_z(\psi) = \begin{bmatrix} 1 & 0 & 0 & 0 \\ 0 & \cos(\psi) & -\sin(\psi) & 0 \\ 0 & \sin(\psi) & \cos(\psi) & 0 \\ 0 & 0 & 0 & 1 \end{bmatrix}, \quad (1)$$

$$R_x(\theta) = \begin{bmatrix} \cos(\theta) & 0 & \sin(\theta) & 0 \\ 0 & 1 & 0 & 0 \\ -\sin(\theta) & 0 & \cos(\theta) & 0 \\ 0 & 0 & 0 & 1 \end{bmatrix},$$

$$R_y(\varphi) = \begin{bmatrix} \cos(\varphi) & -\sin(\varphi) & 0 & 0 \\ \sin(\varphi) & \cos(\varphi) & 0 & 0 \\ 0 & 0 & 1 & 0 \\ 0 & 0 & 0 & 1 \end{bmatrix}$$

where φ is the pan angle of the projector measured counterclockwise from the vertical axis Y-axis, and θ is the tilt angle of the projector measured positive in an upward direction around the horizontal X-axis and ψ the roll angle around Z-axis.

Figure 6:
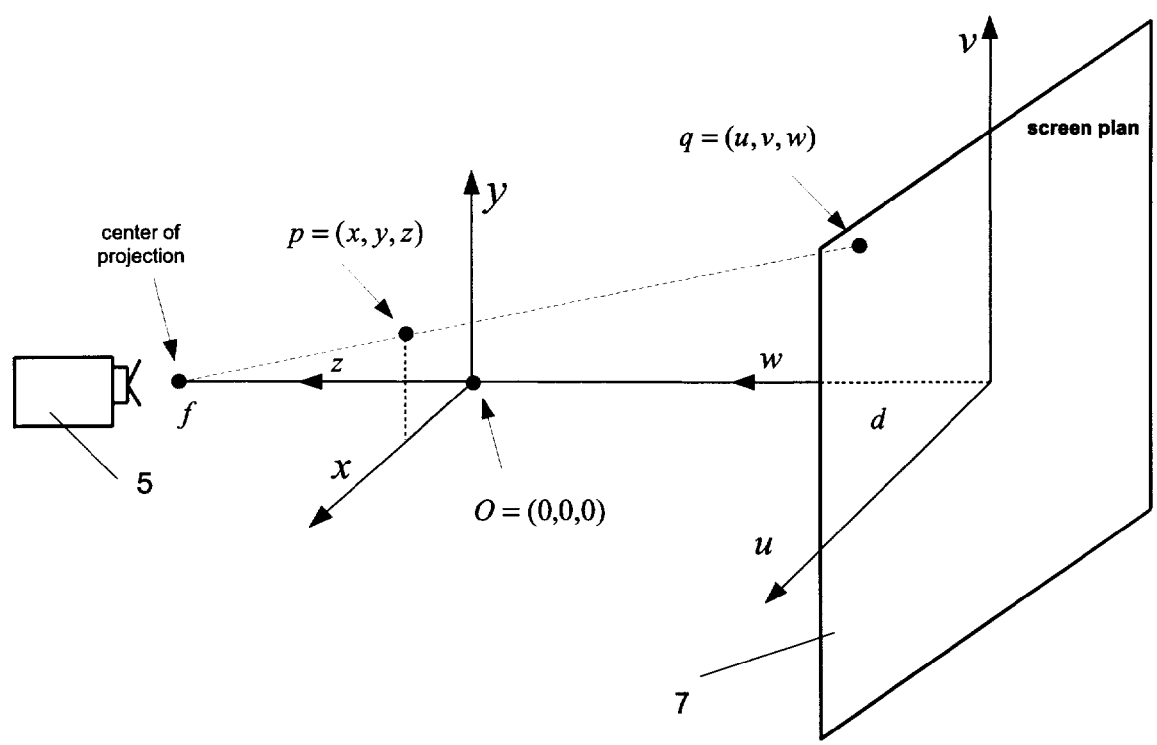
FIG. 6 is a schematic diagram of a basic model of a projection system where the projection screen is plan.

Referring now to FIG. 6, there is shown a line diagram of a simple model of a projection system, where the z axis is aligned with optical axis of the projector 5 and where the z axis is also normal to projection screen 7. This is an ideal projection case, or ideal screen, where the projection q of an image point p does not undergo any distortion. Only a scaling factor is applied to the projected image point p as a function of distance of the screen to the projector:

$$u = x \frac{w+f}{f} \quad (2)$$
$$v = y \frac{w+f}{f}$$
$$w = w$$

As shown in FIG. 6, the focal length f is the distance from the center of projection to the image plane, and s not equal to 0 is an arbitrary scaling factor introduced by homogenous coordinates. Also, w is the distance from the image plane to the screen plane. Homogenous coordinates allow for the representation of a non-linear operation by a linear matrix. In homogenous coordinates image point p and projected image point q are defined as follows:

$$q = (u, v, w, s)^t, \quad p = (x, y, z, 1)^t P = \begin{bmatrix} 1 & 0 & 0 & 0 \\ 0 & 1 & 0 & 0 \\ 0 & 0 & 1 & 0 \\ 0 & 1/f & 0 & 1 \end{bmatrix} \quad (3)$$

q=Pp where, again, f is the distance from the center of projection to the image plane.

Figure 7:
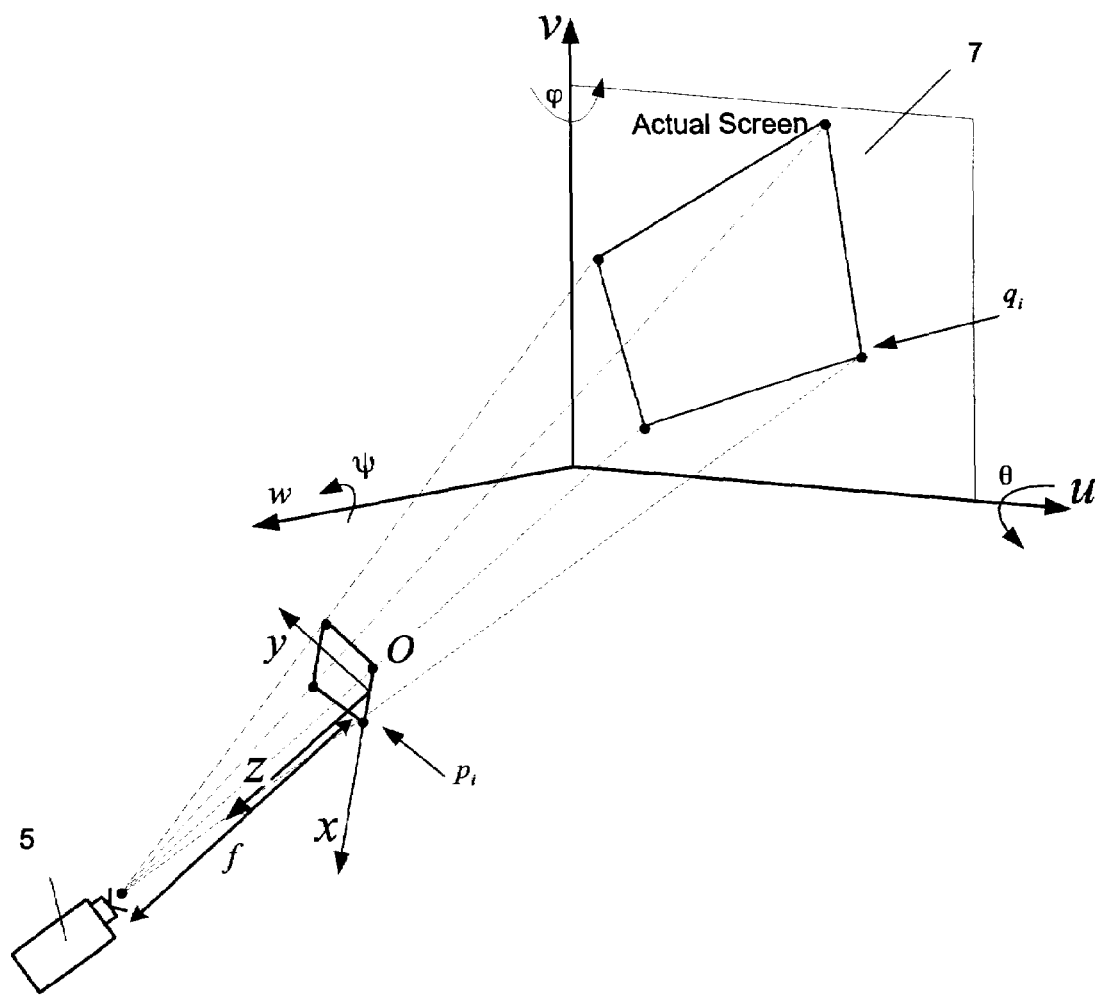
FIG. 7 is another schematic diagram of a model of a projection system where the projection screen is not orthogonal to the projection axis.

Referring now to FIG. 7, there is illustrated a line diagram of a model of a projection system showing projector 5 having a center of projection, and screen 7 that is rotated by certain angles ψ, θ and φ (i.e. geometric parameters) in the screen coordinates reference. It should be understood that the projector 5 is considered to be rotated and that the projection screen 7 is fixed. The projected point, q (u,v,w) is displaced on the screen and follows the relation:

$$q = PR_y(\varphi)R_x(\theta)R_z(\psi)p \quad (4)$$

$$p = R_z^{-1}(\psi)R_x^{-1}(\theta)R_y^{-1}(\varphi)P^{-1}q \quad (5)$$

As shown in FIG. 7, a square rectangle is projected onto a general quadrilateral.

Figure 8:
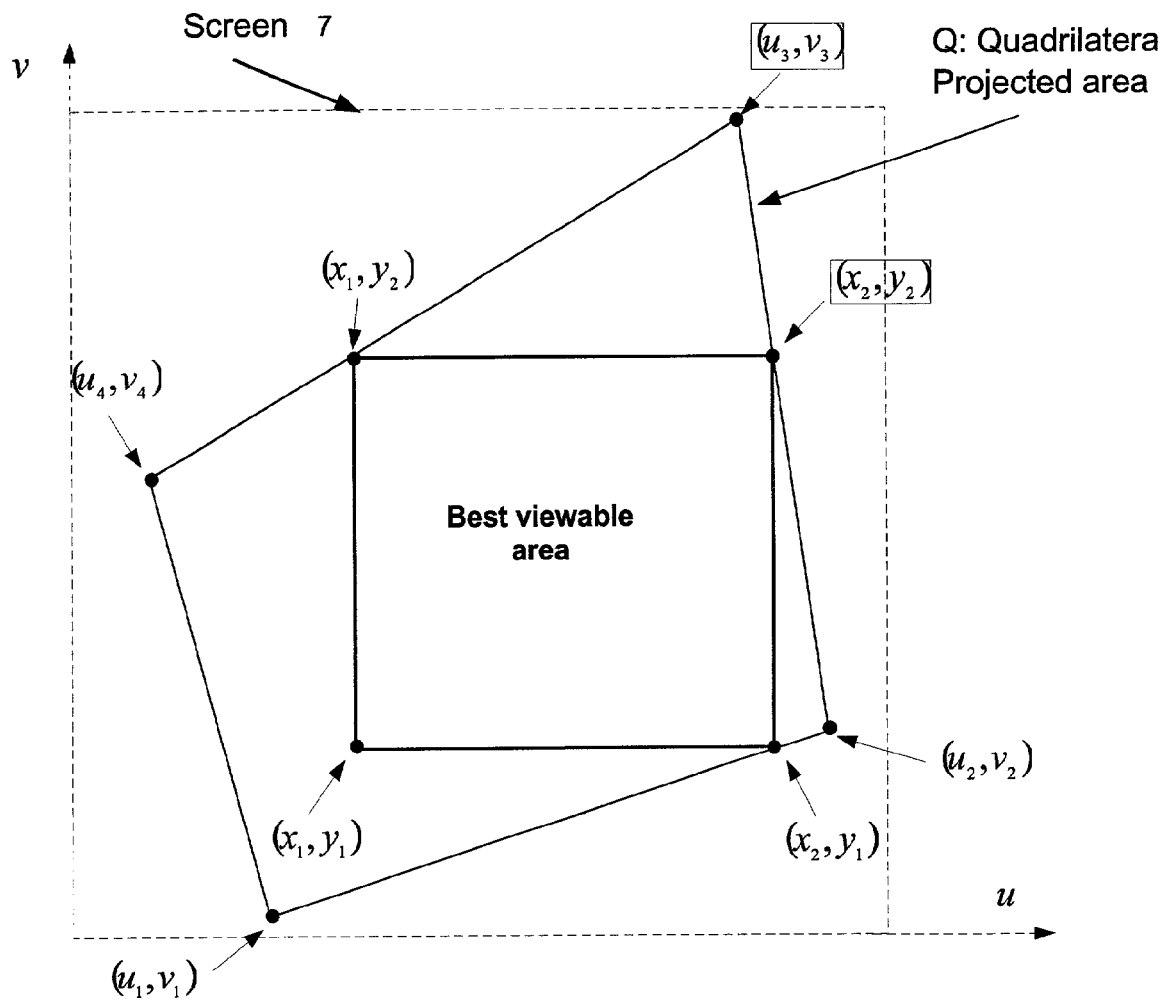
FIG. 8 is a schematic diagram illustrating the configuration of a input square image projected onto the projection screen of FIG. 6 and the reference points used to compute the best viewable area.

Referring now to FIG. 8, there is shown a screen diagram of a square projected onto a projected area Q on screen 7. The projected area Q is a general quadrilateral, but if screen 7 was perpendicular to the optical axis and the image plan parallel to the screen plane, the projected area would be square as well. As will be described, correction system 10 pre-processes the original image, using warp technology so that the projected image looks square on projection screen 7.

The projection of a square, after correction, has to be a rectangle matching the display device aspect ratio. To optimize usage of the screen real state space, a largest rectangle, defined as Best Viewable Area (BVA) must be identified inside the quadrilateral. The BVA is the rectangle with the largest area, or with the highest spatial resolution inscribed onto the projected quadrilateral and with a desired aspect ratio. In the context of this embodiment, the BVA refers to the largest area. Since it is possible to adjust the input image aspect ratio, correction system 10 takes advantage of the elongated shape of the projected quadrilateral to find the largest image with desired aspect ratio that fits onto that elongated shape. For example, this approach gives a 16:9 wide screen image out of 4:3 aspect ratio display device.

In order to simplify the computations it is assumed that the Best Viewable Area (BVA) with the largest area is approximated with the rectangle with the longest perimeter. Accordingly, if the vertices of the BVA are considered to be $(x_1, y_1)$, $(x_2, y_1)$, $(x_2, y_2)$ and $(x_1, y_2)$, they can be determined by solving the equation (6) below:

maximize$(x_2-x_1)+(y_2-y_1)$ perimeter subject to:

$$\begin{cases} x_2 > x_1 & \text{ordered vertices} \\ y_2 > y_1 & \text{ordered vertices} \\ y_2 - y_1 = \rho(x_2 - x_1) & \rho: \text{ desired aspect ratio} \\ (x_i, y_j) \text{ inside } Q, \text{ for } i = 1, 2; j = 1, 2 \end{cases} \quad (6)$$

Q is the quadrilateral with vertices $(u_k, v_k)$, k=1, ..., 4

Equation (6) is solved by linear optimization techniques like the simplex method as discussed in U.S. Pat. No. 5,465,121 to Blalock et al., which is herein incorporated by reference.

Figure 9A:
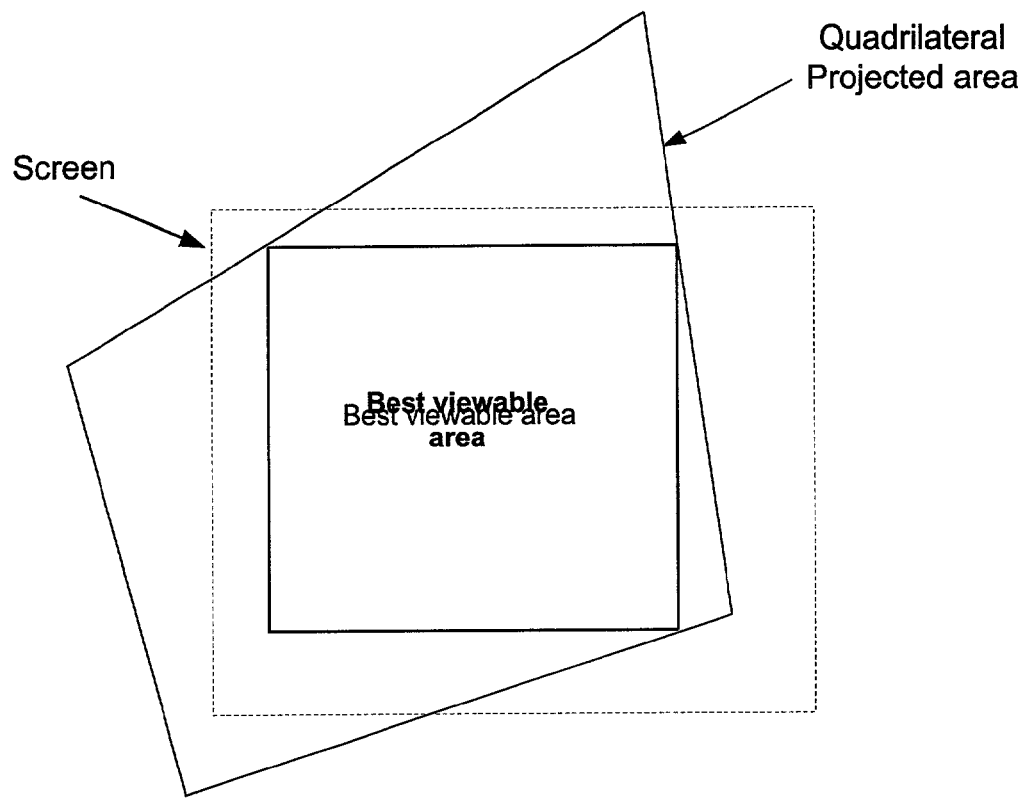
FIG. 9A is a schematic diagram of the projection screen on which is projected the square image of FIG. 8.
Figure 9B:
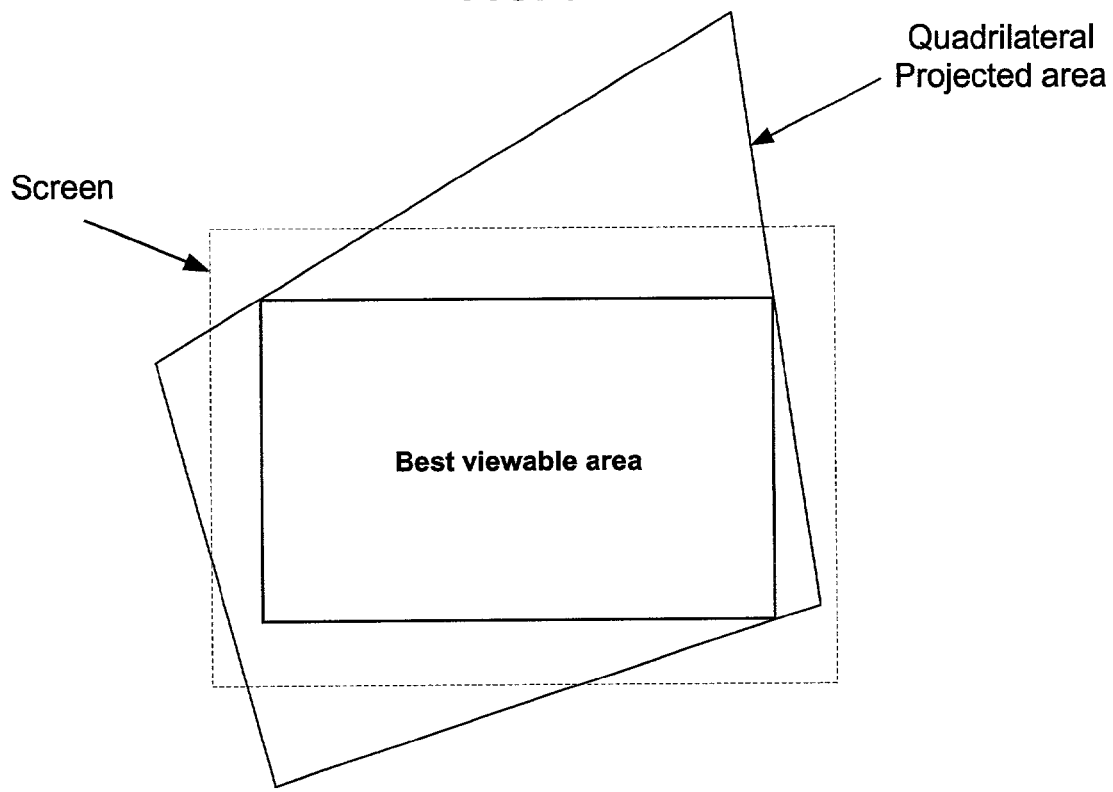
FIG. 9B is a schematic diagram of the rectangle of FIG. 8 adjusted to match the aspect ratio of the display device.

FIGS. 9A and 9B illustrate the Best Viewable Area (BVA) of FIG. 8 which is re-sized to make use of the largest available area on the screen. Using the zoom function on the projector 5 can be used to accomplish this step. FIG. 9A illustrates the case where the input image and projector 5 have the same aspect ratio; while FIG. 9B shows the case where a wide screen 16:9 input image is rendered on a 4:3 display device (e.g. television screen).

FIGS. 10A, 10B and 10C illustrate an application of the present approach to obtain an optimized Best Viewable Area (BVA) for a particular projected area Q. Correction system 10 takes advantage of the elongated shape distorted of the projected area Q and determines a BVA that corresponds to the wide screen aspect ratio. In this way, a cost effective projection of wide screen input video using inexpensive normal 4:3 display device can be achieved. When a 16:9 video is displayed on a 4:3 aspect ratio device, some display area is lost in order to avoid distortion in displayed image as shown in FIG. 10A. The projection of the image of FIG. 10A on off-axis screen using a 4:3 projector would result in a lost screen area inside a 4:3 BVA as shown in FIG. 10B. When the BVA is optimized to take into consideration the aspect ratio of the input image versus the display device aspect ratio, it can be seen on FIG. 10C, that a bigger and better image is projected.

FIGS. 11A to D shows the resulting warp grid that corresponds to the projection and aspect ratio conversion of FIG. 10. FIGS. 11A and 11C show a input image projected at off-axis with a projector with the same aspect ratio as input image. FIGS. 11A and 11C show a wide screen image (16:9) projected at off-axis with a 4:3 projector. It is clear in FIGS. 11C and 11D that the screen usage is better optimized when the aspect ratio conversion is introduced.

Figure 12:
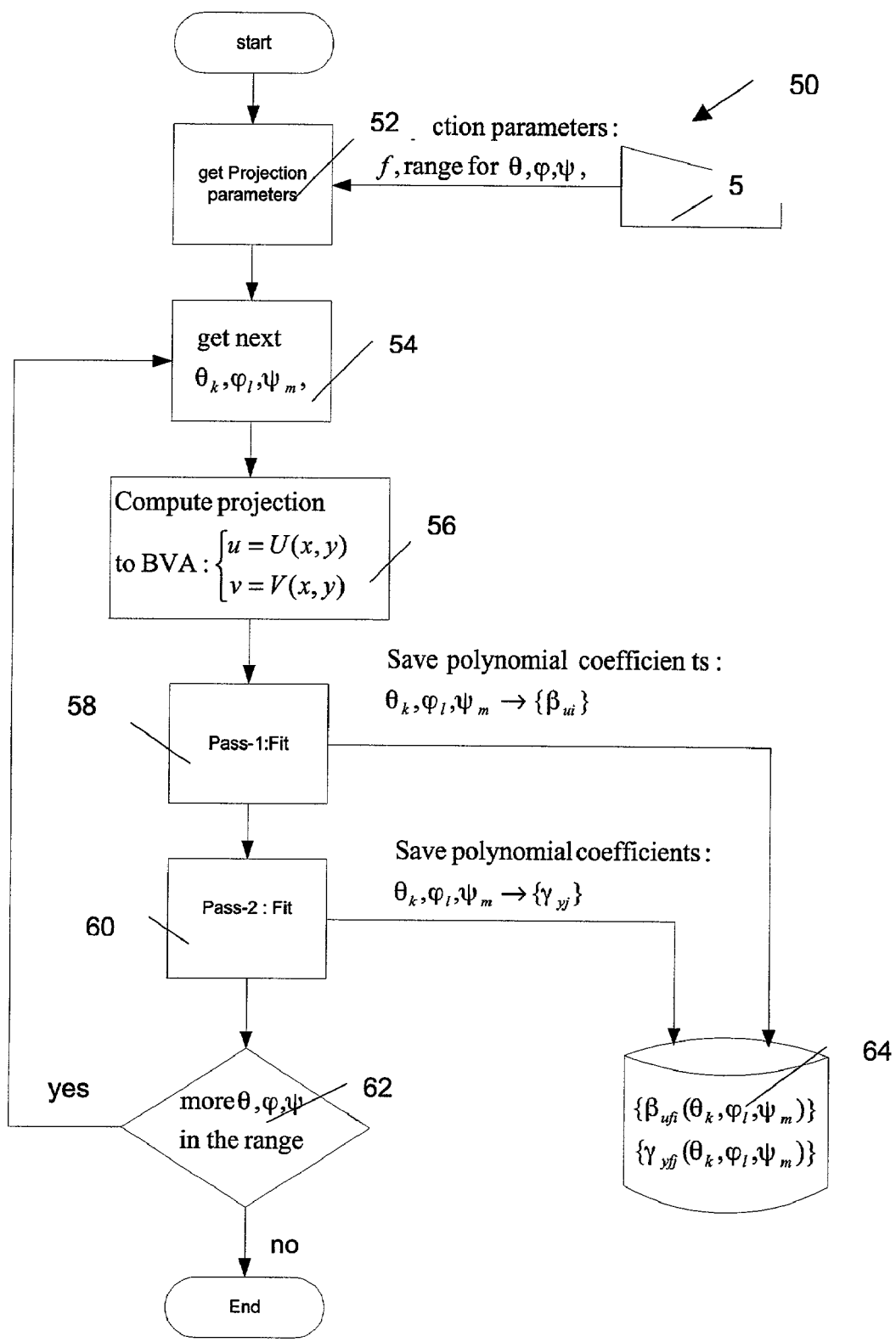
FIG. 12 is a flowchart diagram showing the main process steps required to build the full range of projection distortion parameters according to one part of the correction method of the present invention.

FIG. 12 is a flowchart illustrating the main process steps associated with the correction method 50 of the present invention. At step (52), the projection parameters, namely focal length f, and a range for angles $\psi$, $\theta$ and $\phi$ relating to the angular rotation of screen 7, are obtained either from a projector orientation detector 18 as discussed above and/or the user. At step (54), a particular angular arrangement (i.e. one combination of angles $\psi$, $\theta$ and $\phi$) is chosen.

At step (56), the warp polynomials that correspond to the projection parameters discussed above are determined. The transformation between the vertices of the Best Viewable Area (BVA) and the corresponding vertices of the projected quadrilateral Q defines the mapping required to characterize the distortion caused by projection on a non-ideal screen. This transformation is mathematically a perspective transformation and is defined by the following relation:

$$u = U(x, y) = \frac{a_1 x + a_2 y + a_3}{a_7 x + a_8 y + 1} \quad (7)$$
$$v = V(x, y) = \frac{a_4 x + a_5 y + a_6}{a_7 x + a_8 y + 1}$$

The eight unknown parameters $a_j$, $i=1 \ldots 8$ of equation (7) are found by solving (7) by matching the vertices of the projected quadrilateral $(u_1, v_1)$, $(u_2, v_2)$, $(u_3, v_3)$, $(u_4, v_4)$ to the corresponding vertices of the BVA $(x_1, y_1)$, $(x_2, y_1)$, $(u_2, v_2)$, $(u_1, v_2)$ in FIG. 8. Computational details can be located within U.S. Pat. No. 5,465,121 to Blalock et al. which has been incorporated by reference. Accordingly, the relations (7) define the distortion affecting an input image when it is projected. As conventionally known, image warping is a transformation that maps all positions from one image plane to corresponding positions in the second image plane. Equation (7) is a non-linear sampling of the input image and can be compensated by applying the inverse transformation of (7), before projection, namely:

$$x = X(u, v) = \frac{b_1 u + b_2 v + b_3}{b_7 u + b_8 v + 1} \quad (8)$$
$$y = Y(u, v) = \frac{b_4 u + b_5 v + b_6}{b_7 u + b_8 v + 1}$$

The coefficients of the inverse transformation (8) are derived from their forward counterpart (7) by representing the transformations in matrix form and by computing the inverse matrix. In fact, equation (7) and (8) can be written in homogenous coordinates on the form:

$$A = \begin{pmatrix} a_1 & a_2 & a_3 \\ a_4 & a_5 & a_6 \\ a_7 & a_8 & 1 \end{pmatrix}; B = \begin{pmatrix} b_1 & b_2 & b_3 \\ b_4 & b_5 & b_6 \\ b_7 & b_8 & 1 \end{pmatrix}$$

$(uvs)^t = A(xyr)^t$; and $(xyr)^t = B(uvs)^t$

For scaling factors s and r. The matrix B is found by inverting the matrix A using the adjoint matrix and the determinant of A matrix: B=adj (A)/det(A).

In one embodiment described here and implemented in the svW1 integrated circuit product manufactured by Silicon Optix Inc. of California and described in *GEM Product Brief, Geometry Manipulator Reference Design*, Jul. 18, 2001, herein incorporated by reference, equation (8) is applied to the input image in two steps as a two-separable transformation. Separable transformations achieve better efficiency in term memory access and image re-sampling since the 2D processing is decomposed in a series of two 1D re-sampling along orthogonal axis (rows and columns), this leads to simple hardware implementation. However, it should be understood that the relations of (8) could also be applied is a non-separable way as well.

At step (58) the first pass of the decomposed 2D image processing transformation is performed. In the first pass, each vertical column is re-sampled according to the spatial transformation Y(u,v) and an intermediate image I(u,y) is generated:

$$[u, v] \xrightarrow{Y(u,v)} [u, y] \quad (9)$$
$$[u, y] = \left[u, I(u, y) = \frac{b_4 u + b_5 v + b_6}{b_7 u + b_8 v + 1}\right]$$

At step (60) the second pass of the decomposed 2D image processing transformation is performed. The intermediate image I(u,y) is expressed in term of spatial coordinates [u,y] where y is the final vertical position. But the transformation available EQ8, are functions of [u,v], not function of [u,y]. To find the re-sampling of I(u,y), one needs to express X(u,v) in term of [u,y]. By variable substitution in equation (7), it can be shown that the separated expression is:

$$X'(u, y) = \frac{c_1 y u + c_2 y + c_3 u + c_4}{c_5 y + c_6}$$

$$c_1 = b_2 b_7 - b_1 b_8 \quad (10)$$
$$c_2 = b_1 b_5 - b_2 b_4$$
$$c_3 = b_2 - b_3 b_8$$
$$c_4 = b_3 b_5 - b_2 b_6$$
$$c_5 = b_5 b_7 - b_4 b_8$$
$$c_6 = b_5 - b_6 b_8$$

In the second pass, each horizontal line in I(u,y) is re-sampled according to the spatial transformation X'(u,y)= X(u,Y(u,v))

$$[u, y] \xrightarrow{X'(u,y)} [x, y] \quad (11)$$

The embodiment described uses a polynomial approximation of equations (8) to (11). This kind of polynomial parameterization provides great flexibility and simplifies the task of composition with other type of distortions (e.g. intrinsic projector distortion (lens distortion)).

It should be noted that the first pass can be performed using the positional polynomial:

$$Y(u, v) = \frac{b_4 u + b_5 v + b_6}{b_7 u + b_8 v + 1} \cong p_u(v) = \sum_{k=0}^{d} \beta_k v^k \quad (12)$$

Further, the second pass can be performed using the positional polynomial:

$$X'(u, y) = \frac{c_1 y u + c_2 y + c_3 u + c_4}{c_5 y + c_6} \cong q_y(u) = \sum_{k=0}^{d} \gamma_k u^k \quad (13)$$

It should be noted that the approximation by polynomials (12) and (13) provides more flexibility since it allows for the concatenation of other spatial transformations which can be used to compensate for other image distortions (e.g. lens distortions). In contrast, the procedure for obtaining a parametric description of the distortion, equations (4) to (13) involves costly computations for a real-time embedded devices, like low cost projector.

At step (56) the parameters of equations (12) and (13) for all values of the projection geometric parameters are computed. It should be understood that each coefficient $\beta_i$, $\gamma_j$ in equations (12) and (13) of the position polynomial is a function of spatial positions in the image and angular parameters of the projection. For the example discussed here, angular positions are used for the sake of clarity. The polynomial coefficients from equations (12) and (13) are written as:

$$\beta_{ufi} = \beta_i(\theta, \phi, \psi)$$

$$\gamma_{yfj} = \gamma_j(\theta, \phi, \psi) \quad (14)$$

where equation (14) expresses surfaces in three dimensions that are approximated by polynomial approximation:

$$p_{\hat{a}_{ufi}} = \sum_{0 \le k,l,m \le d} c_{klm} T_k(\theta) T_l(\varphi) T_m(\psi) \quad i = 1 \cdots d_p \quad (15)$$

$$p_{\hat{a}_{yfj}} = \sum_{0 \le k,l,m \le d} d_{klm} T_k(\theta) T_l(\varphi) T_m(\psi) \quad j = 1 \cdots d_p$$

where $T_k(x)$ is a polynomial of degree k in the variable x for a given polynomial basis. It is recommended to use B-splines and Chebychev. For the example discussed, $T_k(x)$ is a Chebyshev polynomial of the first kind of degree k. The example given in equation (15), is limited to three variables for the sake of clarity, but it should be understood that correction method 50 is applicable to any dimensions greater or less than three.

At steps (58) and (60), the polynomials of (15) are stored in computer memory 64. The polynomials must be accessed and computed efficiently, so that low degree polynomial surfaces, $d_p \le 3$, are fitted to the set of coefficients $\beta_{ufi}$ and $\gamma_{yfj}$. These surfaces on the set of coefficients (14) of the transformation, provides an analytical description of the distortion and allow the warp to be performed at undefined angles by interpolation using equation (15).

Figure 13:
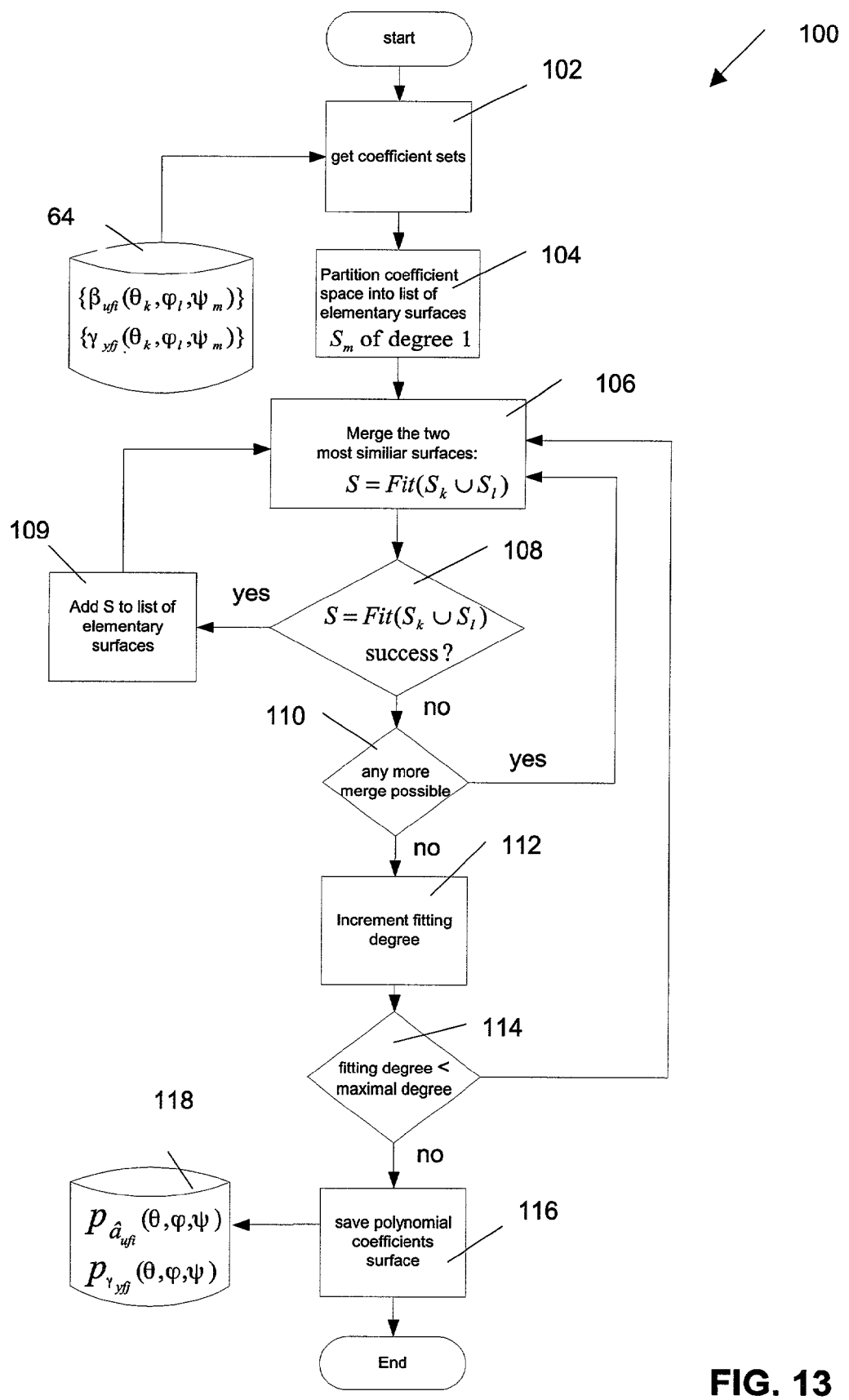
FIG. 13 is a flowchart diagram showing additional process steps required to build the polynomial interpolators for the range set of distortion parameters provided by the process of FIG. 12.

FIG. 13 is a flowchart diagram that illustrates the main process steps that follow from the method steps discussed in respect of FIG. 12. Specifically, the pre-computed surfaces (15) generated at steps (58) and (60) are used to dynamically find the distortion at a given parameter by interpolation. This process also provides for efficient geometric data compression since the memory required to represent the set of all possible distortions is reduced, which is a significant advantage for embedded implementation where memory and computation resources are often very tightly constrained.

At step (102), the coefficient sets are retrieved from memory 64. At step (104), the coefficient space is partitioned into a list of elementary surfaces. At step (106), the two most similar surfaces are merged and then at step (108), it is determined whether there has been a fit. If so then at step (109) S is added to the list of elementary surfaces. If not, then at step (110) it is determined whether any more merge is possible and if so, step (106) is repeated. If not, then at step (112) the fitting degree is incremented. At step (114), it is determined whether the degree of the fitting polynomial is less than the maximal degree imposed by the user. If so, then step (106) is repeated. If not, then the polynomial coefficients surface are saved in memory 118.

Figure 14D:
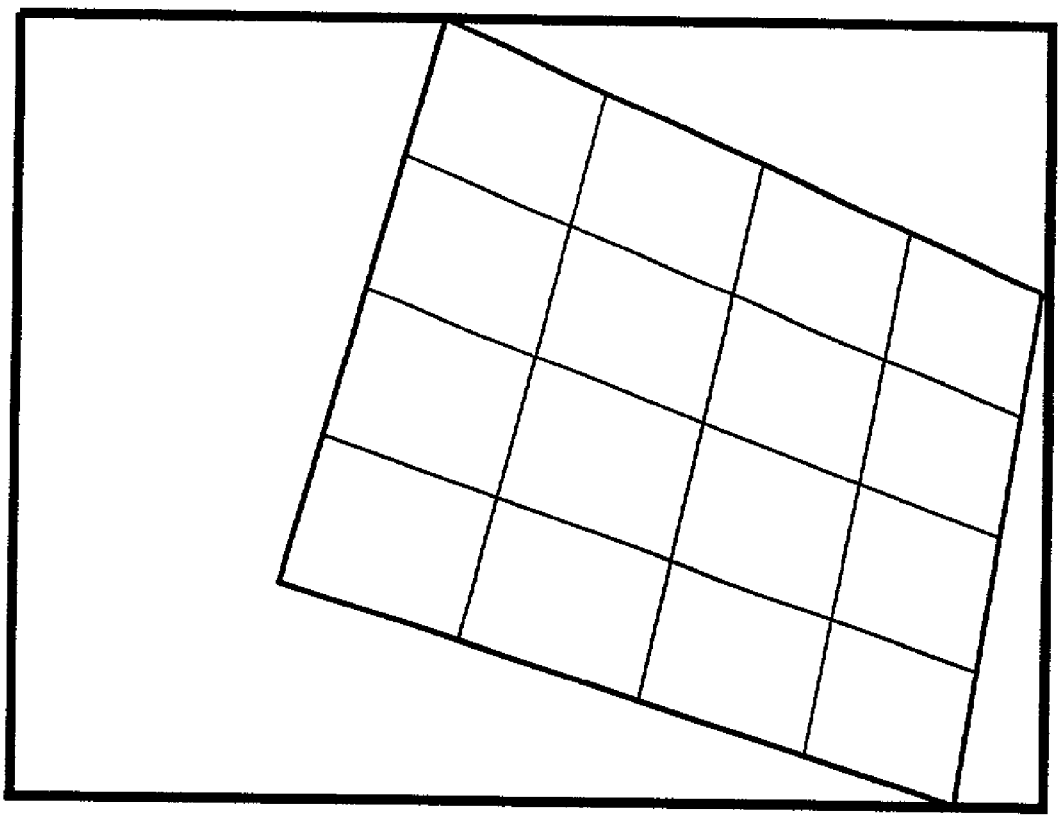

FIG. 14A is a graphical representation of the distortion of an input square grid image when projected onto a projection screen showing the distortion that results from axial displacement. FIG. 14B is a graphical representation of the input image of FIG. 14A. FIGS. 14C and 14D are graphical representations of the first and second passes of the pre-distorted input image of FIG. 14B to compensate for distortion when projected, where the resulting pre-distorted image shown in FIG. 14B, when projected, will result in a non-distorted projected image.

Figure 15A:
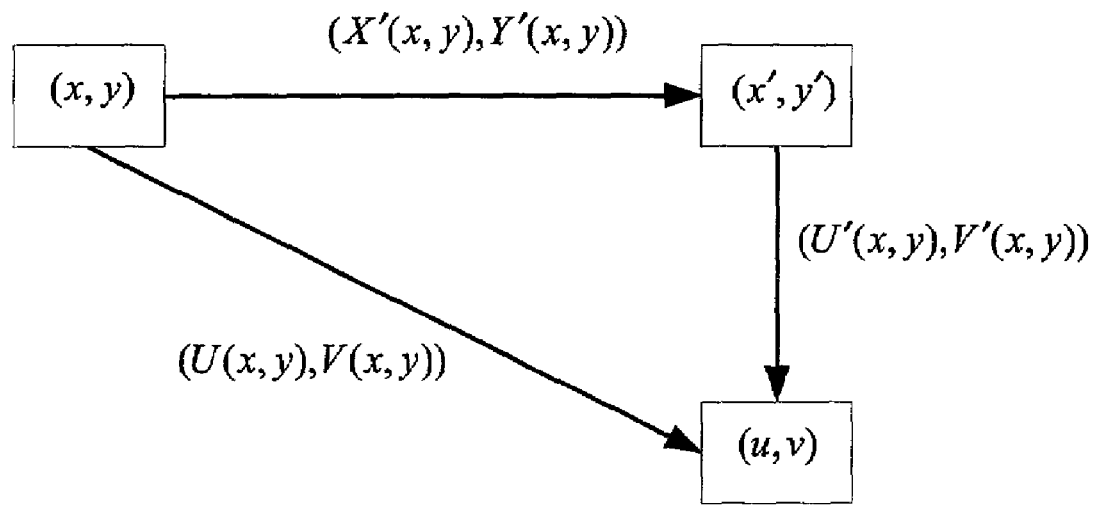
FIG. 15A is a schematic diagram illustrating the concatenation of projection and lens distortion.
Figure 15B:
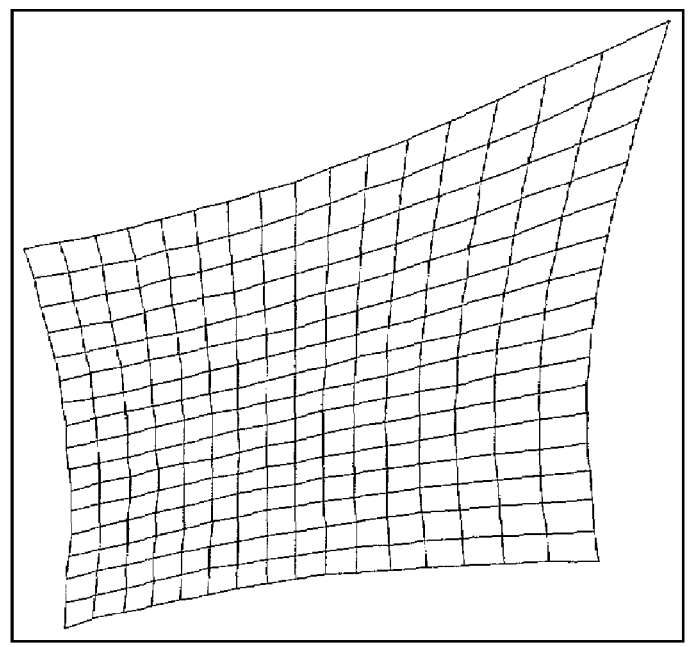
FIG. 15B is a graphical representation of the pre-distorted input image that results from the concatenation illustrated in FIG. 15A.

In a real projection situation, geometric distortion descriptions are extrinsic to the projector 5, since it depends more on positional (rotation angles, distance) information. For the most accurate distortion correction, intrinsic parameters of the projection system need to be considered, mostly lens distortion (radial and tangential). It is clear that the method developed in equations (15) is general enough to handle such a situation. That is, the method described for obtaining the warp polynomial is general enough to allow those skilled in the art to include in the distortion other parameters (e.g. barrel or pincushion lens distortion). A concatenation of distortions can be achieved by applying equation (6) to the image as distorted by intrinsic projector parameters as shown in FIGS. 15A and 15B. The remaining part of the development remains the same. The intrinsic distortion of the projector can either provided by the manufacturer or can be determined during a calibration process.

Accordingly, correction system 10 and correction method 50 and 100 rectify deformations in projected images caused by general projection of a source image onto a screen, when the surface of the screen is not perpendicular to the symmetry axis of the projector lens. Specifically, geometric parameters are provided to a warp engine to correct the complicated distortions encountered in projection. To obtain a distortion free projected image, the source image is pre-distorted in the opposite way to compensate for actual distortion by a warp engine.

It should be understood that while this invention has been described in terms of projected images, projectors, and projection systems, this invention is equally applicable to transforming images taken at one angle/location to images taken from another angle/location. Also, while distortion has been described in the projection case, the same issues arise for an image as seen by camera or recorder where the camera or recorder is off-axis from the image. Thus, an image taken one angle has to be distorted or warped so as to appear to be taken from another angle.

As will be apparent to those skilled in the art, various modifications and adaptations of the structure described above are possible without departing from the present invention, the scope of which is defined in the appended claims.

The invention claimed is:

1. A method for projecting an image onto a viewing surface, wherein the relative orientation of projection axis and the normal direction associated with the viewing surface is characterized by simultaneous presence of at least two of pan, tilt, and roll angles, said method comprising:
    (a) obtaining input image data;
    (b) obtaining the at least two of pan, tilt, and roll angles;
    (c) determining a distorted projected area on the viewing surface in the simultaneous presence of the at least two of pan, tilt, and roll angles, and determining a best viewable area that fits within said distorted projected area such that the best viewable area is optimized with respect to at least one of image area and image resolution, and such that the best viewable area corresponds to the projected image in the absence of the at least two of pan, tilt and roll angles; and
    (d) applying a geometric distortion correction transformation to the input image data to obtain a visually distortion free projected image fitting the best viewable area.

2. The method of claim 1, wherein said geometric distortion correction transformation is represented by surface fits.

3. The method of claim 1, wherein optical distortion parameters are also present, further concatenating an optical distortion correction transformation to said geometric distortion correction transformation, thereby forming an overall distortion correction transformation.

4. The method of claim 3, wherein said method comprises applying the overall distortion correction transformation to the input image data to obtain a distortion free projected image on the optimized best viewable area on the viewing surface.

5. The method of claim 3, wherein said method comprises applying the overall distortion correction transformation as a single-pass 2D image transformation.

6. The method of claim 3, wherein said method comprises applying the overall distortion correction transformation as two separate sequential 1D image transformations.

7. The method of claim 3, wherein said method further comprises:
    (e) separating the overall distortion correction transformation into a first pass transformation and a second pass transformation;
    (f) applying the first pass transformation using one of a first positional polynomial and an incremental polynomial; and
    (g) applying the second pass transformation using one of a second positional polynomial and an incremental polynomial.

8. The method of claim 1, further comprising the determination and storage of a set of distortion parameters, and computing and storing a grid set of corresponding distortion correction transformations that span the entire space of distortion parameters, and dynamically accessing said grid set to determine the overall distortion compensation transformation using interpolation methods.

9. The method of claim 1, wherein the input image data corresponds to a distorted input image, and wherein the method further includes generation of an input distortion correction transformation associated with said distorted input image and concatenation of said input distortion correction transformation with said geometric distortion correction transformation to generate a transformation via which a distortion free output image can be formed on said best viewable area on said viewing surface.

10. The method of claim 1, wherein the viewing surface is an irregular surface, and wherein the method further includes generating a surface transformation associated with said irregular surface and concatenation of the surface transformation with the geometric distortion correction transformation to generate a transformation that, when applied to the input image data, generates a visually distortion free output image on a best viewing area optimized in terms of at least one of an optimized area and an optimized resolution.

11. The method of claim 1, wherein the viewing surface is a panoramic surface and wherein the method further includes generation of an anamorphic conversion transformation associated with said panoramic surface using the aspect ratio in the input image data relative to the aspect ratio of the viewing surface and concatenation of the anamorphic conversion transformation with the geometric distortion correction transformation to generate a transformation such that a distortion free output image is formed on said viewing surface.

12. A projection system adapted to project an image onto a viewing surface, wherein the relative orientation of projection axis and the normal direction of the viewing surface is characterized by simultaneous presence of at least two of pan, tilt, and roll angles, said system comprising:
    (A) a projection parameter input adapted to obtain the input image data and the simultaneously present at least two of pan, tilt, and roll angles; and
    (B) a processor coupled the projection parameter input to determine a distorted projected area on the viewing surface in the presence of the at least two of pan, tilt, and roll angles, and to determine a best viewable area that fits within said distorted_projected area such that the best viewable area is optimized with respect to at least one of image area and image resolution, and such that the best viewable area corresponds to the projected image in the absence of the at least two of pan, tilt and roll angles, said processor being further adapted to apply a geometric distortion correction transformation to the input image data to obtain a visually distortion free projected image fining the best viewable area.

13. The system of claim 12, wherein said processor is adapted to apply the geometric distortion correction transformation is by surface fits.

14. The system of claim 12, wherein optical distortion parameters are also present, and wherein said processor is further adapted to concatenate an optical distortion correction transformation to said geometric distortion correction transformation, thereby forming an overall distortion correction transformation.

15. The system of claim 14, wherein said processor is adapted to apply the overall distortion correction transformation as a single-pass 2 D image transform.

16. The system of claim 14, wherein said processor is adapted to apply the overall distortion correction transformation as two separate sequential 1D image transforms.

17. The system of claim 14, wherein said processor is further adapted:
   (D) to separate the overall distortion correction transformation into a first pass transformation and a second pass transformation;
   (E) to apply the first pass transformation using one of a first positional polynomial and an incremental polynomial; and
   (F) to apply the second pass transformation using one of a second positional polynomial and an incremental polynomial.

18. The system of claim 12, wherein said processor is further adapted to determine and store a set of distortion parameters, and to compute and store a grid set of corresponding distortion correction transformations that span the entire space of distortion parameters, and to dynamically access said grid set to determine the overall distortion correction transformation using interpolation methods.

19. The system of claim 12, wherein the input image data corresponds to a distorted input image, and wherein said processor is further adapted to generate an input distortion correction transformation associated with said distorted input image and to concatenate said input distortion correction transformation with said overall distortion correction transformation to generate a transformation via which a distortion free output image can be formed on said best viewable area on said viewing surface.

20. The system of claim 12, wherein the viewing surface is an irregular surface and wherein the processor is further adapted to generate a surface transformation associated with said irregular surface and to concatenate the surface transformation with the geometric distortion correction transformation of to generate a transformation that, when applied to the input image data, generates a visually distortion free output image on a best viewing area optimized in terms of at least one of an optimized area and an optimized resolution.

21. The system of claim 12, wherein the viewing surface is a panoramic surface and wherein the processor is further adapted to generate an anamorphic conversion transformation associated with said panoramic surface using the aspect ratio of the input image data relative to the aspect ratio of the viewing surface and to concatenate the anamorphic conversion transformation with the overall distortion correction transformation to generate a transformation that can form a distortion free output image in panoramic format on said viewing surface.

\* \* \* \* \*